INVENTOR.
MAX SCHÄFFER

BY Michael J. Striker

United States Patent Office 3,240,448
Patented Mar. 15, 1966

3,240,448
TAIL AND ELEVATOR CONSTRUCTION FOR
AIRPLANES
Max Schäffer, Pullach, near Munich, Germany, assignor
to Messerschmitt A.G., Augsburg, Germany
Filed July 15, 1963, Ser. No. 295,620
Claims priority, application Germany, July 13, 1962,
M 53,556
8 Claims. (Cl. 244—87)

The present invention relates to a tail and elevator construction for airplanes, and more particularly to a tail portion fixedly supporting elevator means and being mounted on the rear end of the fuselage of a jet airplane for turning movement about the horizontal axis.

In conventional airplanes, the rudder and elevator means are mounted for turning movement on a tail portion of the fuselage. When the discharge pipe of a jet engine is placed in the rear end of the fuselage, difficulties arise in providing sufficient space for the control linkage means by which the elevators are operated. The linkage means have to be guided around the jet engine plant which causes a greater weight of the aircraft.

It is one object of the present invention to overcome this disadvantage of conventional airplanes, and to provide an airplane with a tail portion carrying fixed elevator means but no rudder so that the elevator means can be operated by turning of the tail portion.

Another object of the invention is to pivotally mount a tail portion on the rear end of the fuselage in a position surrounding the discharge pipe of a jet engine so that the pitch of the airplane can be controlled by turning the tail portion with elevators fixed thereon.

Another object of the present invention is to mount a pipe portion within a tail portion carrying fixed elevators, and to place this pipe portion in communication with a discharge pipe end portion of a jet engine mounted on the fuselage of the plane, so that when the tail portion is turned with the fixed elevators thereon, the thrust of the jet engine is deflected to aid the variation of the pitch of the aircraft under the control of the elevator means.

Another object of the invention is to provide an aircraft with a simple construction for varying the pitch of the aircraft.

With these objects in view, one embodiment of the present invention relates to an airplane on whose fuselage a tail portion is mounted for angular movement about a horizontal axis. The tail portion extends the streamlined contour of the fuselage and carries fixed thereon a pair of elevators, and when the tail portion is turned about the horizontal axis, the angle of attack of the elevators is changed so that the pitch of the airplane is varied.

Control means are provided on the airplane, preferably in the fuselage, and connected by linkage to the interior of the tubular tail portion for adjusting the angular position of the same.

The discharge pipe end portion of a jet engine mounted on the fuselage of the airplane rearwardly projects beyond the rear end of the fuselage into the turnable tail portion according to the present invention. In one embodiment the discharge portion of the jet engine is rigid with the fuselage, and the tail portion turns relative to the same, sufficient clearance being provided between the rearwardly projecting discharge pipe portion, and the pivotable tubular tail portion.

In another embodiment of the invention, a pipe discharge portion is mounted in the tail portion for pivotal movement with the same, and overlaps and communicates with the discharge pipe of the jet engine in all angularly displaced positions of the tail portion when the same is displaced to adjust the angle of attack of the elevators. In this manner, the action of the elevators is aided by the action of the thrust of the jet engine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
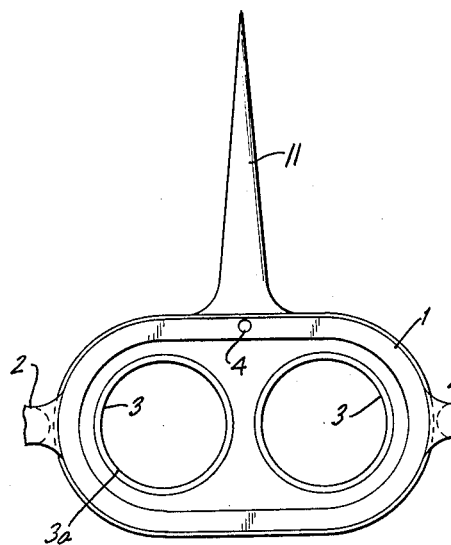
FIG. 1 is a fragmentary rear view of an airplane provided with the tail construction according to one embodiment of the invention and illustrated in the neutral position of the tail portion.
Figure 2:
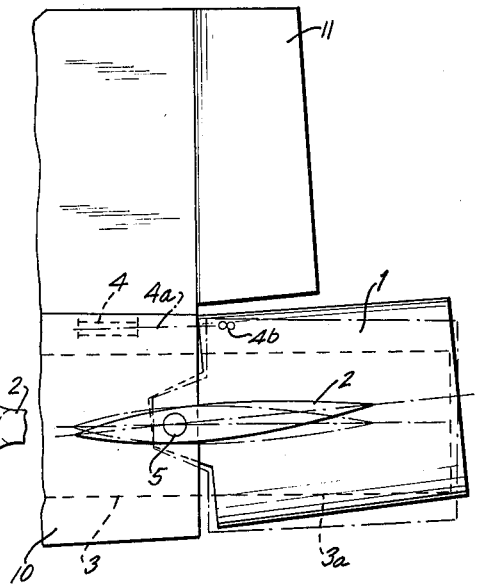
FIG. 2 is a fragmentary side elevation of the embodiment shown in FIG. 1, illustrating another operative position of the tail portion with the elevators.

Referring now to the drawing, and more particularly to FIGS. 1 and 2, the rear end portion 10 of the fuselage of a jet aircraft supports rudder means 11. A tubular tail portion 1 is supported on a pair of pivot means 5 for angular turning movement about a horizontal axis. Pivot means 5 are mounted on the rear end of the rear end portion 10 of the fuselage. Elevators 2 project from opposite sides of the outer surface of the tubular tail portion 1, and are fixedly secured to the same so that turning of tail portion 1 about pivot means 5 will cause a variation of the angle of attack of elevators 2, and consequently a variation of the pitch of the aircraft.

The rear end portion 10 has a longitudinally streamlined outer surface bounded in the rear by a transverse annular edge having a predetermined outline best seen in FIG. 1. Tail portion 1 has a stremlined surface merging into the contour of the surface of end portion 10 and bounded in front by a transverse annular edge matching the edge of rear end portion 10.

A rigid discharge pipe 3 has its main part located in the fuselage end portion 10 and connected to the jet engine, and a rearwardly projecting part which extends into the interior of the tubular tail portion 1.

The pipe end portion 3a which is located within the tubular tail portion 1, is sufficiently spaced from the inner surface of the tail portion so that the tail portion can be turned about pivot means 5 without interfering with the rigid discharge pipe end portion 3a.

Control means are provided for angularly displacing the pipe end portion 1, and include hydraulic cylinder and piston means 4 connected by a linkage means 4a to points 4b on the inner surface of the tubular tail portion 1, so that by reciprocation of the hydraulic piston means 4, tail portion 1 with the fixed elevators 2 can be displaced about the horizontal axis defined by the pivot means 5. Since the hydraulic piston and cylinder means are well known, they are only schematically indicated in the drawing. It is evident that the hydraulic piston and cylinder means 4 may be replaced by pneumatically operated piston, or by a mechanical control means.

Figure 3:
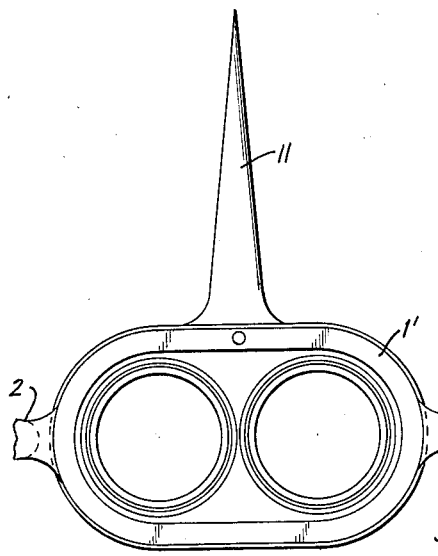
FIG. 3 is a fragmentary rear view of another embodiment of the invention illustrated in a neutral position.
Figure 4:
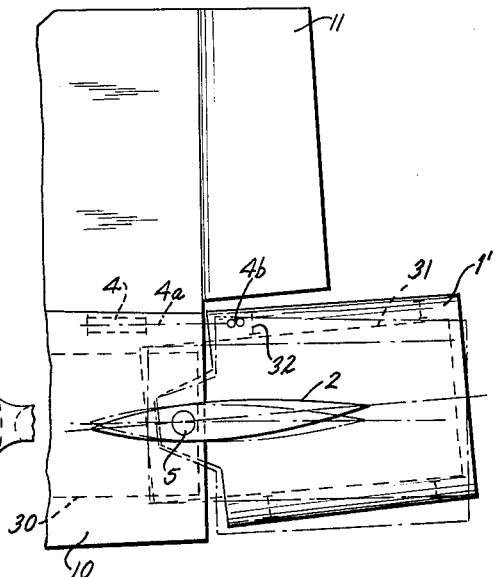
FIG. 4 is a fragmentary side elevation of the embodiment of FIG. 3 illustrating the tail portion in another operative position.

In the embodiment illustrated in FIGS. 3 and 4, the rear end portion 10 of the fuselage carries the rudder 11 which is turnable about a vertical axis, as described with reference to FIGS. 1 and 2. Control means 4, 4a, 4b are provided for turning the tubular tail portion 1' about a horizontal axis defined by pivot means 5. A pair of elevators 2 is rigidly secured to the outer surface of tail portion 1', the elevators 2 projecting laterally in opposite directions, as described with reference to FIGS. 1 and 2. A first discharge pipe portion 30 for the jet engine is located in the rear end portion 10 of the fuselage, and terminates in the region of its rear end. A second discharge pipe portion 31 is fixedly secured and rigidly supported within the tubular tail portion 1' by means of brackets 32. The front end of discharge pipe portion 31 overlaps with the rear end of discharge pipe portion 30, so that the two pipe end portions communicate, and the jet engine discharges through both pipe end portions 30, 31 from the rear end of the tail portion 1'. The diameter of the second discharge pipe portion 31 is somewhat greater than the diameter of the first discharge pipe portion 30 to permit the angular displacement of pipe portion 31 relative to pipe portion 30 which takes place when the tail portion 1' is pivoted by the control means 4, 4a, 4b about pivot 5 for the purpose of changing the angle of attack of the elevators 2.

Since displacement of the tail portion 1' with elevators 2 also causes angular displacement of the discharge pipe portion 31, the jet thrust is deflected to aid the action of the elevators 2, resulting in a particular rapid variation of the pitch of the airplane. This arrangement is particularly advantageous for use in vertical take-off and landing aircraft.

The construction according to the present invention not only results in a substantial saving of weight as compared with conventional constructions in which the elevators are mounted for turning movement on the rear end of the fuselage which supports the rudder, but also has the advantage of being more rigid, and causing a greater pitch variation for a comparatively smaller variation of the angle of attack of the elevators.

It will be understood that each of the elements described above, or two or more together, may also find a useful application in other types of tail end constructions of airplanes differing from the types described above.

While the invention has been illustrated and described as embodied in a tail portion rigidly supporting elevators, and being pivotally mounted on the rudder-supporting rear end portion of the fuselage of an airplane and being constructed to deflect the jet thrust simultaneously with the angular displacement of the elevators, it is not intended to be limited to the details shown, since various modifications rand structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The combination of an airplane having a fuselage, with a tubular tail portion; a pair of elevators fixedly secured to said tail portion laterally projecting from opposite sides of the outer surface of the same; means for supporting said tail portion on said airplane for angular movement about a horizontal axis passing through said elevator means so that the leading parts of said elevator means are located forwardly, and the trailing parts of said elevator means are located rearwardly of said axis; jet discharge pipe means located within said fuselage and said tail portion; and control means mounted on said airplane connected to said tubular tail portion for turning the same about said horizontal axis so that said elevators turn with said tail portion about said axis to vary the pitch of said airplane.

2. In an airplane, in combination, a fuselage adapted to support a jet engine and having a rear end portion having a longitudinally streamlined outer surface bounded in the rear by a transverse annular rear edge having a predetermined outline; a discharge pipe means for the jet engine having a pipe end portion located rearwardly of said rear end portion of said fuselage; a tubular tail portion surrounding said pipe end portion and being transversely spaced from the same, said tail portion having a longitudinally streamlined outer surface merging into the contour of said outer surface of said rear end portion and being bounded in front by a transverse annular front edge having an outline matching said predetermined outline of said rear edge and located adjacent said rear edge; means for supporting said tail portion on said rear end portion of said fuselage for angular movement about a horizontal axis; a pair of elevators fixedly secured to said tail portion laterally projecting from opposite sides of the outer surface of the same and having portions located forwardly and rearwardly of said axis; and control means on said fuselage connected to said tail portion for turning the same about said horizontal axis and relative to said pipe end portion so that said elevators turn with said tail portion about said axis to vary the pitch of the airplane.

3. In an airplane, in combination, a fuselage adapted to support a jet engine and having a rear end portion having a longitudinally streamlined outer surface bounded in the rear by a transverse annular rear edge having a predetermined outline; a rigid discharge pipe for the jet engine having a pipe end portion projecting rearwardly from said rear end portion of said fuselage; a tubular tail portion surrounding said pipe end portion and being transversely spaced from the same, said tail portion having a longitudinally streamlined outer surface merging into the contour of said outer surface of said rear end portion and being bounded in front by a transverse annular front edge having an outline matching said predetermined outline of said rear edge and located adjacent said rear edge; means for supporting said tail portion on said rear end portion of said fuselage for angular movement about a horizontal axis; a pair of elevators fixedly secured to said tail portion laterally projecting from opposite sides of the outer surface of the same and having portions located forwardly and rearwardly of said axis; and control means on said fuselage including linkage means connected to the interior of said tail portion and being located outside of said pipe end portion, said control means being adapted to turn said tail portion about said horizontal axis and relative to said pipe end portion so that said elevators turn with said tail portion about said axis to vary the pitch of the airplane.

4. In an airplane, in combination, a fuselage adapted to support a jet engine and having a rear end portion having a longitudinally streamlined outer surface bounded in the rear by a transverse annular rear edge having a predetermined outline; a first discharge pipe portion for the jet engine fixedly secured within said rear end portion of said fuselage; a tubular tail portion located rearwardly of said rear end portion of said fuselage; means for supporting said tubular tail portion on said rear end portion of said fuselage for angular movement about a horizontal axis, said tail portion having a longitudinally streamlined outer surface merging into the contour of said outer surface of said rear end portion and being bounded in front by a transverse annular front edge having an outline matching said predetermined outline of said rear edge and located adjacent said rear edge; a pair of elevators fixedly secured to said tubular tail portion laterally projecting from opposite sides of the outer surface of the plane and having portions located forwardly and rearwardly of said axis; a second discharge pipe portion rigidly supported and fixedly secured in the interior of said tubular tail portion for angular movement with the same, said second discharge pipe portion having a front end overlapping the rear end and communicating with the rear end of said first discharge pipe portion in all turned positions of said tail portion and of said second discharge pipe portion; and control means within said fuselage connected to said tail portion for turning the same about said horizontal axis with said second discharge pipe portion and said elevators so as to vary the pitch of the airplane.

5. In an airplane, in combination, a fuselage adapted to support a jet engine and having a rear end portion having a longitudinally streamlined outer surface bounded in the rear by a transverse annular rear edge having a predetermined outline; a first discharge pipe portion for the jet engine fixedly secured within said rear end portion of said fuselage; a tubular tail portion located rearwardly of said rear end portion of said fuselage; means for supporting said tubular tail portion on said rear end portion of said fuselage for angular movement about a horizontal axis, said tail portion having a longitudinally streamlined outer surface merging into the contour of said outer surface of said rear end portion and being bounded in front by a transverse annular front edge having an outline matching said predetermined outline of said rear edge and located adjacent said rear edge, a pair of elevators fixedly secured to said tubular tail portion laterally projecting from opposite sides of the outer surface of the plane and having portions located forwardly and rearwardly of said axis; a second discharge pipe portion rigidly supported and fixedly secured in the interior of said tubular tail portion for angular movement with the same, said second discharge pipe portion having a front end projecting into said rear end portion of said fuselage overlapping and communicating with the rear end of said first discharge pipe portion in all turned positions of said tail portion and of said second discharge pipe portion; and control means within said fuselage including linkage means connected to the interior of said tail portion and being located outside of second discharge pipe portion for turning said tail portion about said horizontal axis with said second discharge pipe portion and said elevators so as to vary the pitch of the airplane.

6. In an airplane, in combination, a fuselage adapted to support a jet engine and having a rear end portion; a rigid discharge pipe for the jet engine having a pipe end portion projecting rearwardly from said rear end portion of said fuselage having a longitudinally streamlined outer surface bounded in the rear by a transverse annular rear edge having a predetermined outline; a rudder mounted on said rear end portion of said fuselage turnable about a vertical axis; means for operating said rudder located in said fuselage and connected to said rudder; a tubular tail portion surrounding said pipe end portion and being transversely spaced from the same; said tail portion having a longitudinally streamlined outer surface merging into the contour of said outer surface of said rear end portion and being bounded in front by a transverse annular front edge having an outline matching said predetermined outline of said rear edge and located adjacent said rear edge; means for supporting said tail portion on said rear end portion of said fuselage for angular movement about a horizontal axis; a pair of elevators fixedly secured to said tail portion laterally projecting from opposite sides of the outer surface of the same and having portions located forwardly and rearwardly of said axis; and control means on said fuselage including linkage means connected to the interior of said tail portion and being located outside of said pipe end portion, said control means being adapted to turn said tail portion about said horizontal axis and relative to said pipe end portion so that said elevators turn with said tail portion about said axis to vary the pitch of the airplane.

7. The combination of an airplane having a fuselage; jet discharge pipe means located within said fuselage projecting rearwardly therefrom; a tubular tail portion; means for supporting said tail portion at the rear end of said fuselage surrounding said jet discharge pipe means and turnable relative to said fuselage about a transversal axis for angular movement; and guide means fixedly secured to said tail portion located partly forwardly and partly rearwardly of said transversal axis so that the leading parts of said guide means are located forwardly and the trailing parts of said guide means are located rearwardly of said transversal axis.

8. The combination of an airplane having a fuselage; jet discharge pipe means including a jet discharge pipe immovably secured to said fuselage projecting rearwardly therefrom; a tubular tail portion; means for supporting said tail portion at the rear end of said fuselage surrounding said jet discharge pipe and turnable relative to said fuselage about a transversal axis for angular movement; and guide means fixedly secured to said tail portion located partly forwardly and partly rearwardly of said transversal axis so that the leading parts of said guide means are located forwardly and the trailing parts of said guide means are located rearwardly of said transversal axis.

References Cited by the Examiner

UNITED STATES PATENTS

| | | | |
|---|---|---|---|
| 2,376,780 | 5/1945 | Kenyon | 244—87 |
| 2,765,993 | 10/1956 | Custer | 244—52 |
| 2,868,478 | 1/1959 | McCloughy | 244—52 |
| 2,959,378 | 11/1960 | Eggers et al. | 244—76 |
| 2,961,188 | 11/1960 | Taylor | 244—52 X |

FOREIGN PATENTS 795,050    5/1958    Great Britain.

OTHER REFERENCES

Space/Aeronautics: February 1960, pages 47–49.

MILTON BUCHLER, *Primary Examiner.*

ANDREW H. FARRELL, *Examiner.*